July 22, 1969 R. J. FAHEY 3,456,426
EGG CARTON CLOSER
Filed March 14, 1968 5 Sheets-Sheet 1
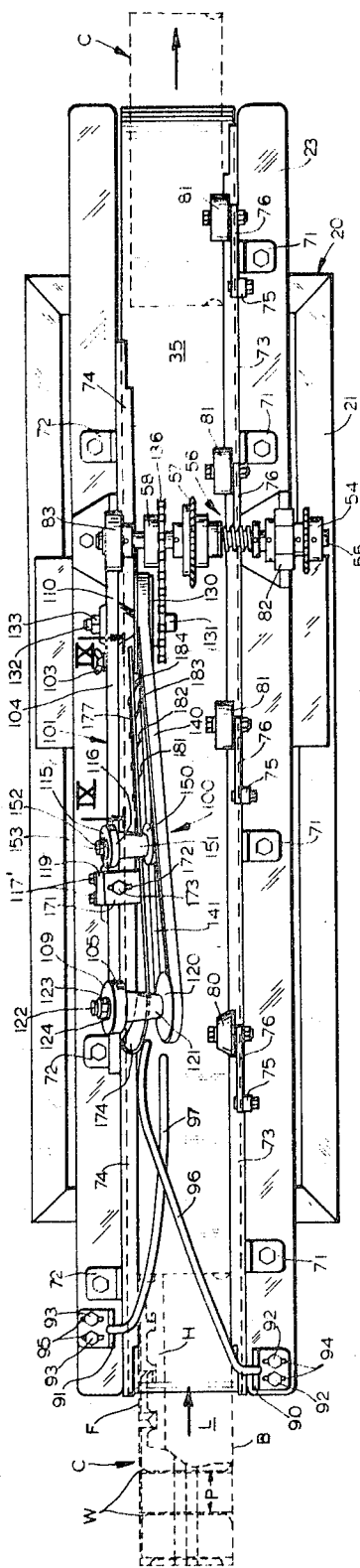
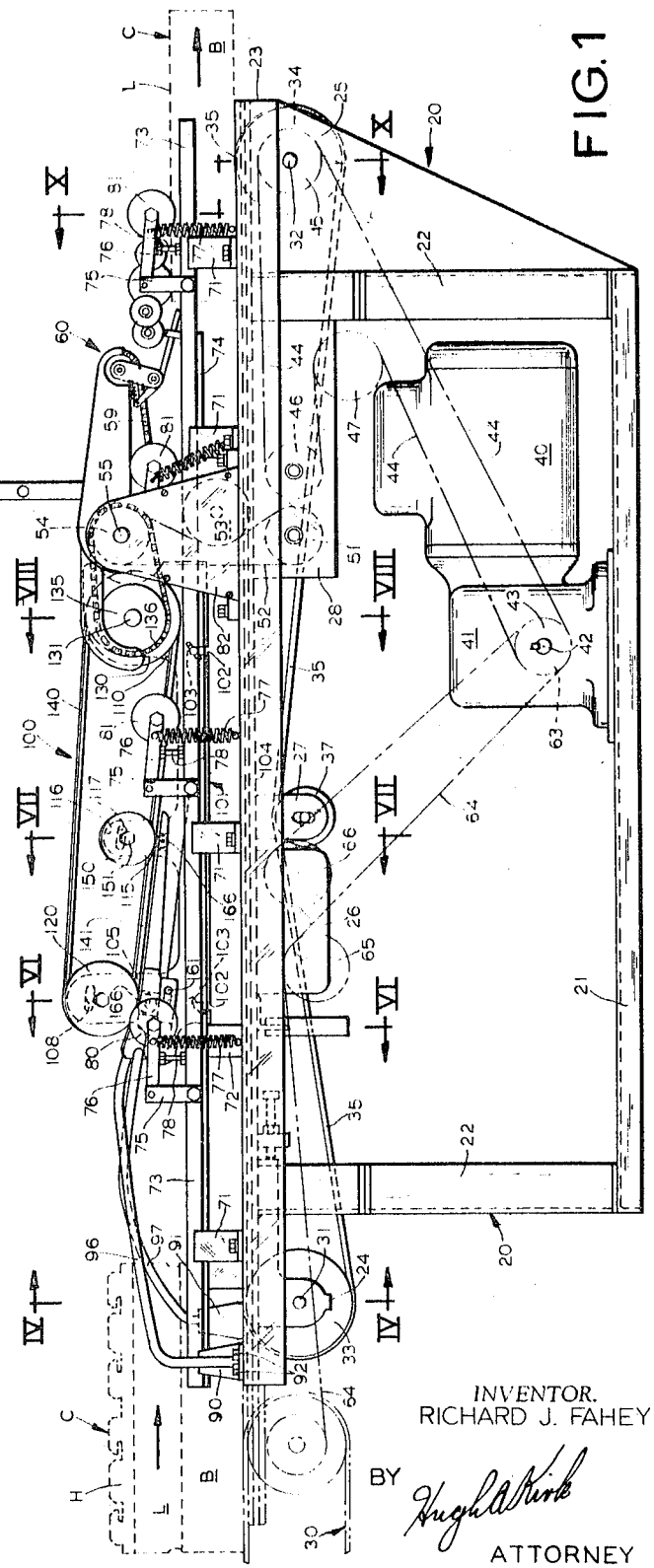
INVENTOR.
RICHARD J. FAHEY
BY
*Hugh A. Kirk*
ATTORNEY July 22, 1969  R. J. FAHEY  3,456,426
EGG CARTON CLOSER
Filed March 14, 1968  5 Sheets-Sheet 2

INVENTOR.
RICHARD J. FAHEY
BY
*Hugh A Kirk*
ATTORNEY

July 22, 1969  R. J. FAHEY  3,456,426
EGG CARTON CLOSER
Filed March 14, 1968  5 Sheets-Sheet 3
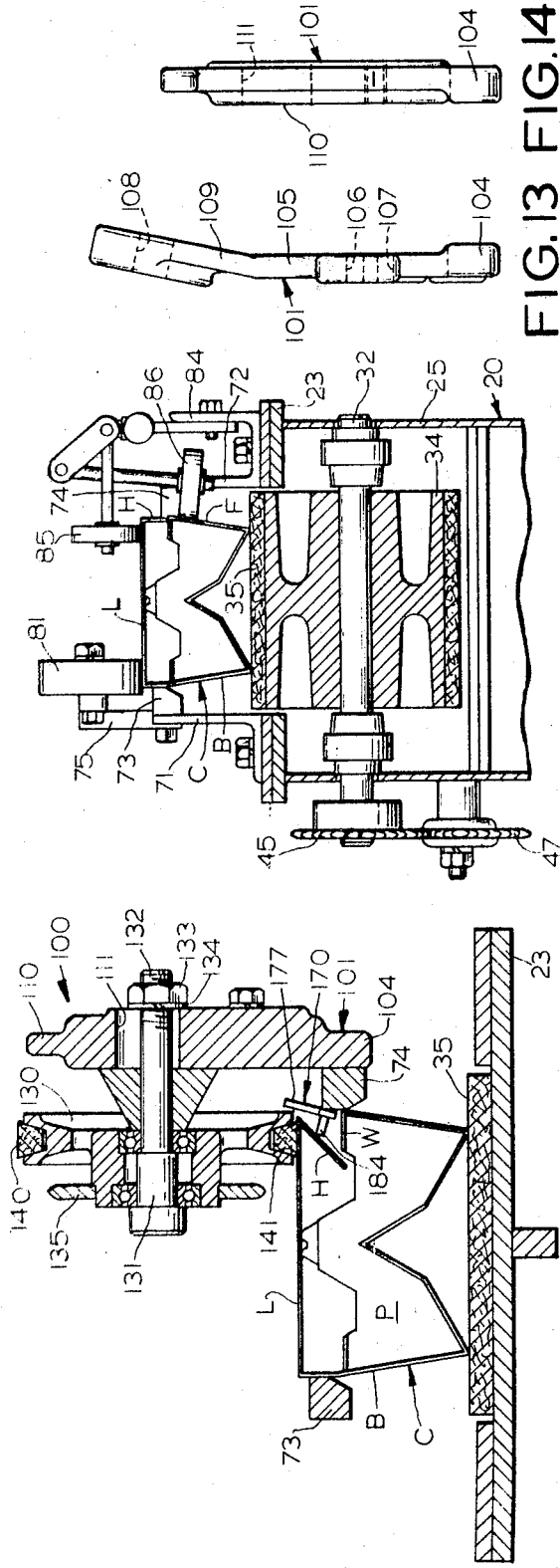
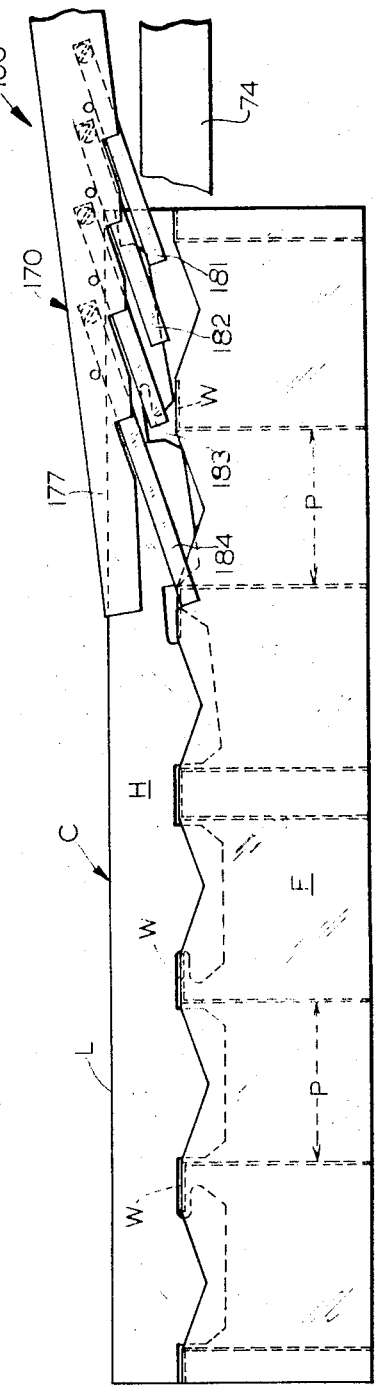
INVENTOR.
RICHARD J. FAHEY
BY
ATTORNEY

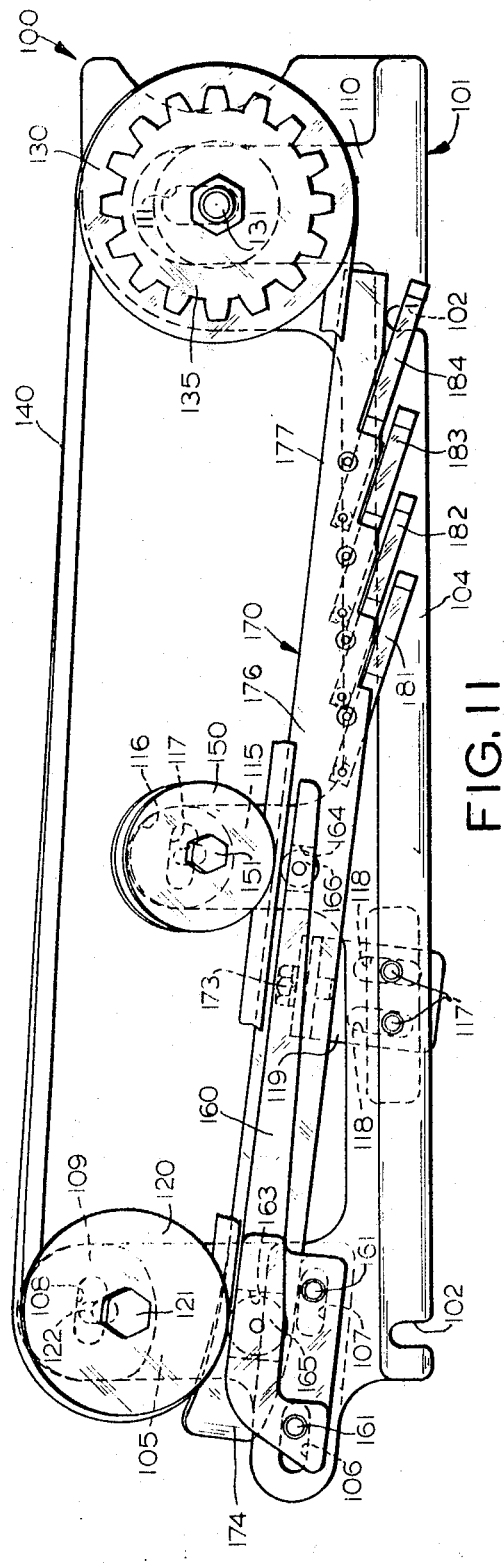

July 22, 1969   R. J. FAHEY   3,456,426
EGG CARTON CLOSER

Filed March 14, 1968   5 Sheets-Sheet 5

INVENTOR.
RICHARD J. FAHEY

BY   *Hugh A Kirk*

ATTORNEY 3,456,426
EGG CARTON CLOSER
Richard J. Fahey, Glenview, Ill., assignor to Consolidated Packaging Corporation, Chicago, Ill., a corporation of Michigan
Continuation-in-part of application Ser. No. 522,661, Jan. 24, 1966. This application Mar. 14, 1968, Ser. No. 717,069
Int. Cl. B65b 7/22, 7/26
U.S. Cl. 53—376
21 Claims

ABSTRACT OF THE DISCLOSURE

A machine for automatically closing filled paperboard egg cartons of several different sizes indiscriminately, which cartons have covers that hinge along one side of the cartons and have hook containing flaps which lock along the opposite side of the cartons. These filled cartons with their covers extending vertically upwardly are longitudinally fed on a conveyor through the machine of this invention which first bends over the covers and their flaps by a pair of fixed and crossed folding bars, and then guides and locks the covers, flaps, and hooks into closed and locking position by a pre-adjusted and removable and/or floating assembly. This assembly has a driven endless belt and shoe to hold and guide the cover, and a spring finger containing strip for the hook flaps.

RELATED APPLICATIONS

The present application is a continuation-in-part of my copending application, Ser. No. 522,661 filed Jan. 24, 1966, now abandoned, entitled, "Egg Carton Closer."

SUMMARY OF THE INVENTION

Generally speaking, the different sized paperboard egg cartons which are closed by the machine of this invention all have substantially the same width but vary in height or depth depending upon the size eggs which are placed in them, which height variation amounts to about twenty percent between the lowest and the highest carton. The cover for these cartons, which is hinged to one longitudinal wall, has at its outer end a foldable flap with hooks thereon for engagement under the horizontal triangular webs at the ends of the cross-partitions which separate the eggs in the carton.

The automatic machine of this invention for closing these different height egg cartons, includes a main frame, a horizontal conveyor supported by this frame, means to drive the conveyor, and guide means on each side of the conveyor for guiding the cartons lengthwise through the machine. The closing mechanism for the covers or lids of the cartons passed through this machine, comprises, first, a pair of folding bars, one fixed to each side of the conveyor which arch up along and cross over each other in the direction of movement of the cartons, for bending over the covers and their hook flaps from a vertical to about 45° and 135° angular positions, respectively, for introduction into the second part of the closing mechanism.

This second and final part of the closing mechanism comprises an endless belt and guide shoe assembly, removably fastened to the main frame, which may be readily replaced by a similar pre-adjusted assembly which also may be pivoted at one and the carton entrance end and floating at its other end. This assembly comprises a sub-frame upon which are mounted a pair of spaced adjustable pulleys between which is an endless belt, the lower reach of which rides over the upper surface of the cover of the carton adjacent the fold edge of the flap. This lower reach of the belt starts at an angle acute with the horizontal both transversely and longitudinally of the motion of the conveyor, and ends substantially horizontal, transversely of the conveyor. The center part of the lower reach of this belt is backed by a third and idler pulley which is also adjustable. Both the pulley at the start end of the belt and the idler pulley are adjustable horizontally and vertically, by being mounted in acute angled slots on the sub-frame as well as having their anchoring pins or bolts in these slots eccentric to the axes of the pulleys themselves. The pulley adjacent the final closing end of this belt is usually only vertically adjustable, in that its shaft is substantially horizontal and transverse to the direction of motion of the conveyor, and is spaced above the conveyor a distance equal to that of the closed cover of the highest carton. Connected to this pulley of the endless belt is a means for driving this belt through an easily disengageable driving means, such as a shaft and sprocket wheel and short sprocket chain. This short sprocket chain then connects to gearing from the same mechanism that drives the conveyor, but drives this endless belt at a faster rate than the conveyor in order to compensate for any slippage and this belt's angularity with respect to the conveyor.

Also adjustably mounted on the sub-frame of this removable assembly, and located just beneath the eccentrically adjustable pulleys is a first adjustable shoe which may contain rollers in its upper surface opposite said adjustable pulleys for engaging the under surface of the cover and holding the cover against the lower reach of the belt for properly guiding the cover into position for permitting the proper locking of the hooks on the flap. This first fixed shoe is also adjustably mounted in longitudinal slots in the sub-frame at an acute angle to the horizontal in the direction of the conveyor.

A second shoe or guide plate is also adjustably mounted both horizontally and vertically in slots on the sub-frame and an L-bracket. This guide plate comprises a twisted strip that extends from an acute angle to the horizontal at the starting end of the assembly to an obtuse angle in the same direction from the horizontal at the final end of the assembly. Near this final end is provided a plurality of spaced spring fingers which spring inwardly for pushing in the flaps and their hook portions before the cover is pushed into closed position, so that the hooks will engage beneath the webs at the ends of the cross-partitions in the carton.

If desired, this machine also may be provided with a tape applicator for sealing the cover of the carton, and/or a dater, after the cover of the carton has been closed and its flap hooked.

Accordingly, it is an object of this invention to produce a new, simple, efficient, effective, economic, durable machine which will automatically close indiscriminately different size cartons for all of the four major different grades of eggs, i.e. small, medium, large and giant, without readjustment for each different size of carton.

Another object is to produce such a machine wherein a driven endless belt and guide shoe carton closing assembly may be easily and quickly removed from the machine and replaced by another similar assembly, which has been pre-adjusted, thereby eliminating long down-times for the closing machine and insuring fresher eggs for the market.

Another object is to provide such an assembly for such a machine which assembly is pivoted at one and floats at its other to automatically compensate for different size cartons.

A further object is to provide such a replaceable endless belt and guide shoe assembly which contains pulleys and guides that are adjustable in several different directions including vertically, horizontally and at angles thereto.

A still further object is to provide means for driving the endless belt on such a removable closer assembly at a speed greater than that of the conveyor for the cartons through the machine to compensate both for any slippage which may occur and for the difference in linear velocity of its angularity with respect to the direction of movement of the conveyor.

BRIEF DESCRIPTION OF THE DRAWINGS

The above mentioned and other features and objects of the invention and the manner of attaining them will become more apparent and the invention itself will be understood best by reference to the following description of preferred embodiments of the invention taken in conjunction with the accompanying drawings, wherein:

FIG. 1 is a side elevation of one embodiment of a single path automatic egg carton closing machine according to the present invention, including part of a final tape applying device, and with many of the driving parts therefor being shown in dash-dot lines, and in dotted lines an open egg carton entering the machine and a closed egg carton leaving the machine;

FIG. 2 is a plan view of the machine shown in FIG. 1, with some of the covers and the tape applying device removed to show more clearly the folding bars and the removable endless belt and guide shoe assembly of the present invention;

FIG. 8 is a further enlarged vertical sectional view taken along line VIII—VIII of FIG. 1 in the direction of the arrows, showing a carton near the end of the removable or floating belt and guide assembly, with spring fingers pushing in the hook flap so that the hooks thereon can engage beneath the webs at the ends of the cross-portions in the cartons;

FIG. 9 is a further enlarged view with parts removed taken along line IX—IX in FIG. 2, showing how the spring fingers on the removable or floating belt and guide assembly engage the front side and hook flap of one of the smallest cartons for interlocking the hook flap with the front of the carton for completing the closure of the carton;

FIG. 10 is an enlarged vertical sectional view taken along line X—X in FIG. 1 in the direction of the arrows, showing the closed carton as it leaves the machine and passes by the pressure rollers following a tape sealer device;

FIG. 11 is an enlarged side elevation of the removable belt and guide assembly removed from the machine shown in FIG. 1 or FIG. 2;

FIG. 12 is a top plan view of the removed belt and guide assembly shown in FIG. 11;

FIG. 13 is a left end view only of the stripped sub-frame of the removed assembly shown in FIG. 11;

FIG. 14 is a right end view only of the stripped sub-frame of the assembly shown in FIG. 11;

DETAILED DESCRIPTION OF PREFERRED EMBODIMENTS

Figure 3:
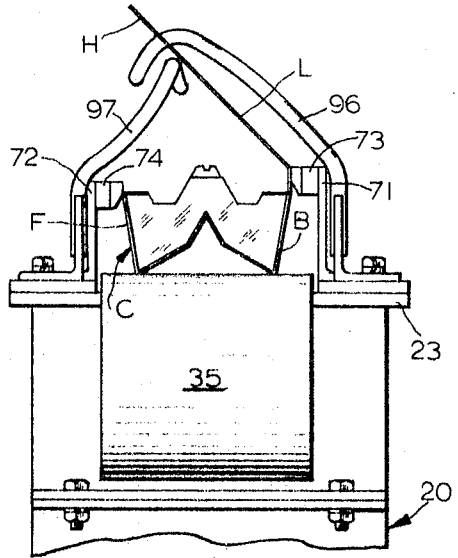
FIG. 3 is an enlarged left end view of the upper part of the machine shown in FIGS. 1 and 2 with the cover of an egg carton having been partly bent over the carton by the first folding bar contacted.

The detailed description of the above figures will now be divided into the following sections:

I. The main frame:
(A) The Conveyor.
(B) The driving Mechanism for the conveyor.
(C) The guide means.
II. The fixed folding bars.
III. The removable endless belt and guide assembly:
(A) The sub-frame and its mountings.
(B) The endless belt mechanism:
(1) Adjustable entrance pulley.
(2) Adjustable driving pulley.
(3) Adjustable idler pulley.
(C) The adjustable guide shoe.
(D) The adjustable flap closing strip.

I. The main frame

Referring first to FIGS. 1 and 2, the main frame 20 of the machine of this invention may comprise a rectangular base 21 and four legs 22 at its corners for supporting a table 23. Under the top of the table 23 may be provided bearing mounting brackets 24 and 25 near each end thereof, brackets 26, 27 and 28 intermediate the ends for mounting the driving rollers, sprockets and pulleys for the conveyor and other movable parts of the machine, and may also include driving connections for an adjacent feeding conveyor mechanism 30, shown in phantom at the left end of FIG. 1.

I(A). The conveyor

In the end brackets 24 and 25 there are journalled shafts 31 and 32 upon which may be mounted rollers 33 and 34 (see also FIGS. 4 and 10) for mounting and driving the endless belt conveyor 35 by which the egg cartons C are continuously moved through the machine of this invention while longitudinally resting on the top of said conveyor 35, such as being fed by a similar endless belt conveyor 30 shown at the left in FIG. 1. Below the center portion of the table 23 there may be provided a vertically adjustable idler roller 37 (see also FIG. 7) on the bracket 27 for taking up any slack in the belt of the conveyor 35 along its lower reach.

I(B). The driving mechanism for the conveyor

Mounted on the main frame 20, such as on the rectangular platform base 21, there may be a combination electric motor 40 and gear reduction box 41 having a driving shaft 42 which may have keyed thereto a driving sprocket 43 connected by sprocket chain 44 to driving sprocket 45 on the shaft 32 and thence around another driving sprocket 46 on bracket 28, back around idler sprocket 47 to the driving sprocket 43. The sprocket chain 44 thus drives the conveyor 35 and also the sprocket 46 which through a gear mechanism on bracket 28 drives the sprocket wheel 51, and thence via sprocket chain 52 by idler sprocket wheel 53 to drive sprocket wheel 54 on shaft 55, upon which may be mounted a friction clutch 56 and driving sprocket wheels 57 and 58, the former of which may be connected by sprocket chain 59 (see FIG. 1) to drive a sealing tape and dating mechanism 60, which may be attached near the discharge end of the conveyor 35 of the machine. The other sprocket wheel 58 drives the endless belt on the removable endless belt and guide assembly described in Section III(B) below.

As also shown in phantom in FIG. 1, there may be provided an additional driving sprocket 63 on the shaft 42 which, via sprocket chain 64 over idler sprocket wheels 65 and 66, drives the feeding conveyor 30 shown at the left of the machine in FIG. 1.

I(C). The guide means

Mounted on the top of the table 23 there may be provided two rows of brackets 71 and 72, the taller ones 71 being on one side of the conveyor 35, and shorter brackets 72 being along the other side of said conveyor 35. On the former taller brackets 71 is mounted a higher guide rail 73 parallel with the conveyor 35 to guide the top edge of the back wall B of the carton C to which the cover or lid L is foldably attached, which lid has at its outer edge a foldable hook flap H. Spaced the width of the cartons C, all of which are substantially the same width, and parallel to the bar 71 is a lower guide bar 74 along the opposite side of the conveyor 35 located below the lowest top edge of the front wall F of the smallest closed carton C (see also FIG. 9). Thus, every carton C successively and longitudinally passes between the guide rails 73 and 74 to insure its proper engagement by the closing mechanism of this machine.

Figure 6:
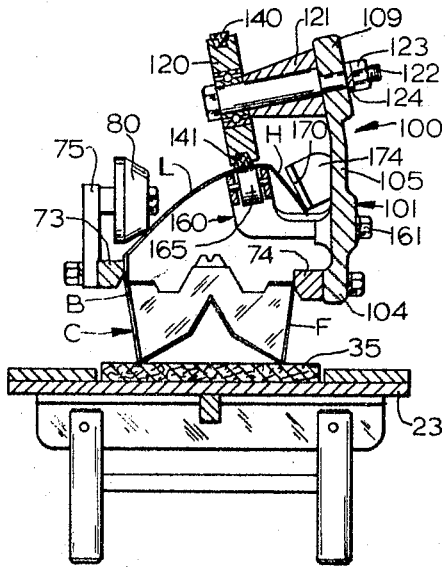
FIG. 6 is an enlarged vertical sectional view taken along line VI—VI in FIG. 1 in the direction of the arrows, showing the start of the cover folding of a carton as it comes into the removable or floating belt and guide assembly of the machine of this invention.

Attached to the guide rail 73 there may be provided upwardly extending projections 75 having at their ends pivoted lever arms 76 which may be urged by springs 77 against adjustable stops 78 (see FIG. 1). The ends of these levers 76 are provided with rollers 80 and 81, the first roller 80 of which may be bevelled to contact the contour of the partly bent-over lid L as shown in FIG. 6, while the other rollers 81 may have horizontal contacting surfaces to press down on the back edge of the lids L of the cartons C and help to hold the cartons onto the conveyor 35 as shown in FIG. 10. The stops 78 prevent the rollers from being pulled by the tension springs 77 below the upper edge of the side wall of the lowest carton, so as not to hinder the movement of the cartons C along the conveyor 35 by acting as stops for the forward ends of the cartons C as they pass by the rollers 80 and 81.

Also on each side of the conveyor 35 and on top of the table 23, are provided brackets 82 and 83 for supporting the shaft 55 for driving the mechanisms mounted above the conveyor 35, namely, the endless belt on the removable belt and guide assembly and the taping mechanism 60.

As partly shown in FIGS. 1 and 10, there may be provided on the opposite side of the conveyor 35 along rail 74 at its discharge end, a bracket 84 which may support a pair of rollers 85 and 86 at right angles to each other for pressing the tape strip which may be applied by the sealing tape applying mechanism 60. However, these particular rollers 85 and 86 are not a part of this invention and are located beyond the closing mechanism thereof.

II. The fixed folding bars

Figure 4:
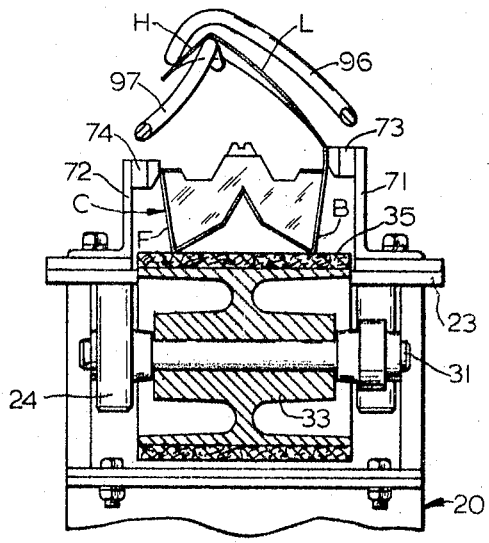
FIG. 4 is an enlarged vertical section taken along line IV—IV of FIG. 1 in the direction of the arrows, showing how one of the smallest cartons has its cover hook flap folded over by the stationary folding bars.
Figure 5:
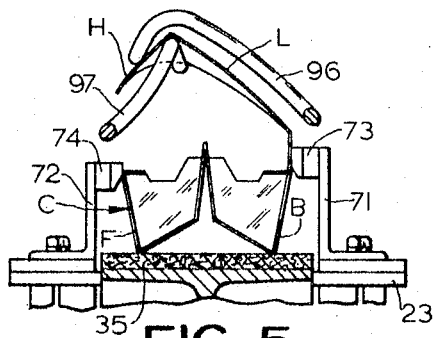
FIG. 5 is a vertical sectioned view, similar to FIG. 4, with parts removed but showing how one of the largest cartons has its cover hook flap folded over by the same stationary folding bars shown in the machine of FIGS. 1 and 2.

Referring now specifically to FIGS. 1 through 5, there are shown anchored on opposite sides of the conveyor 35 and directly to the top of the table 23, a pair of fixed brackets 90 and 91, mounted by screws 92 and 93 in slots 94 and 95 in the table 23, which brackets 91 and 92 have rigidly or integrally affixed thereto, upwardly and longitudinally along the reach of the conveyor, lid L and flap H folding rods 96 and 97, respectively. The former rod 96 first bends at almost a right angle to the vertical to extend at an acute angle upwardly, along the direction of the conveyor, and out over and across the path of the conveyor, and then bows slightly downwardly to bend over the hook folding flap H as shown in FIGS. 4 and 5. The other rod 97, which is attached from bracket 91, which bracket 91 is mounted slightly forward in the direction of the conveyor with respect to the bracket 90, also first bends at almost a right angle to the vertical to extend at an acute angle upwardly, and less than half way out over, and along the path of the conveyor, and then bends slightly downwardly and along the conveyor crossing just under the bowed portion of the first folding rod 96 so as to guide the under side of the hook flap H and support the under side of the cover or lid L adjacent the fold line for the flap H, as shown in FIGS. 4 and 5, for introduction of the lid L into the removable endless belt and guide assembly closing portion of the machine of this invention, described in the next Section III.

The relative shapes of these folding bars 96 and 97 are very important, and have been pre-formed so as to fold cartons from the largest to the smallest in size, that is those for pullet eggs up to jumbo or giant eggs, which cartons have different height covers L and different width flaps H, without further change or adjustment, once they have been properly fastened by the bolts 92 and 93 in the slots 94 and 95 in the table 23. This difference in height between the smallest and largest cartons C and in length between the hook flaps H of the smallest and largest cartons C, is shown in FIGS. 4 and 5, respectively; both size cartons being properly folded by the bars 96 and 97 for introduction into the removable belt and guide assembly for closing and locking the covers or lids on the cartons.

III. The removable endless belt and guide assembly

Figure 15:
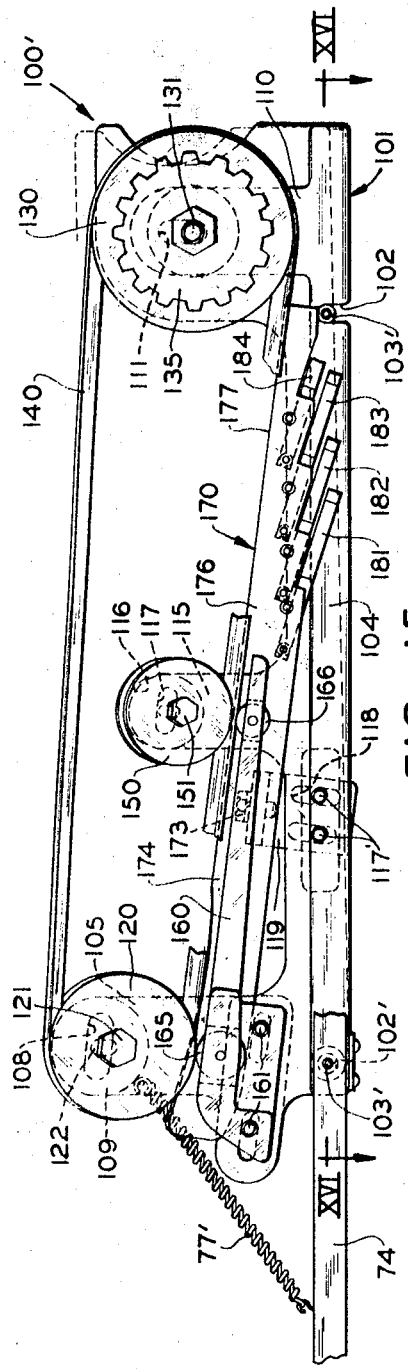
FIG. 15 is an enlarged side elevation of another and floating embodiment of the removable belt and guide assembly slightly reduced from that shown in FIG. 11, in full lines in one of its limiting positions and in dotted lines in its other limiting position and showing the pivoted and slotted type mounting therefor.

Referring now to FIGS. 1, 2, 6 through 16 and specifically FIGS. 11, 12 and 15, there is shown the pre-adjusted removable and floating endless belt and guide assemblies 100 and 100', which may be quickly and easily removed and replaced upon the machine of this invention so as to reduce the amount of "down" time for the machine to the barest minimum.

III(A). The sub-frame and its mountings

The removable and/or floating endless belt and guide assemblies 100 or 100' comprises a sub-frame 101, the bottom edge of which is provided with a pair of spaced downwardly open notches 102 (see FIGS. 1 and 11) or a pivot bearing 102' (see FIGS. 15 and 16), by which it may readily be dropped over bolts or wing nuts 103 (see FIGS. 1 and 2) or attached by shoulder bolts 103' (see FIG. 16), respectively, to the rear of the outside of the guide rail 74 for its ready installation and removal. The slots 102, pivot bearing 102', and bolts 103 and 103' are carefully made so that when the sub-frame 101 is in position, it will be in the same position on any other machine, as well as on the jig or standard machine upon which it has been pre-adjusted.

Figure 16:
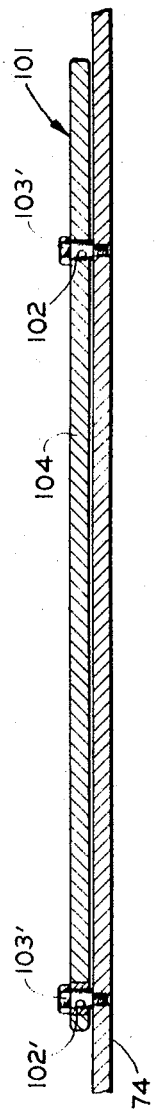
FIG. 16 is a horizontal section taken along line XVI—XVI in FIG. 15 showing the shoulder bolt type of mounting for the floating sub-frame.

In the embodiment having the floating endless belt and guide assembly 100' shown in FIGS. 15 and 16, the carton entrance end is provided with a bushing pivot 102' anchored by a shoulder bolt 103' to the outer side of the guide bar 74 with only a downwardly open slot 102 near its exit end. This slot 102 is sufficiently long to permit guidance by its shoulder bolt 103' from the full line position for the lowest cartons as shown in FIG. 15 to that of its dotted line position for the exit end of the assembly 100' for the highest or extra large egg cartons. If desired, the weight of the assembly 100' and its belt 140 on the top of the larger cartons C may be counterbalanced in part by a tension spring 77' fastened between the upper end of the upwardly extending bracket member 105 of the sub-frame 101 and the top of the guide bar 74 as shown at the left in FIG. 15.

Referring now more specifically to FIGS. 11, 12, 13, 14 and 15, the sub-frame 101 may be provided with a bottom rail portion 104 in which the notches 102 bearing 102' are located, which rail portion 104 rests against the outside of the rail 74. Projecting upwardly from the left end of this sub-frame 101 is a bracket member 105, the upper end of which is bent slightly inwardly over the conveyor at an acute angle to the vertical, and is provided with a plurality of slots 106, 107 and 108, the latter one being in the bent-over upper portion 109 (see also FIG. 13) of this bracket 105, and all three slots extending longitudinally at an acute angle downwardly in the direction of movement of the conveyor 35.

Near the opposite end of the sub-frame 101, there is provided another upwardly extending vertical bracket member 110 (see also FIG. 14), which is not bent inwardly at the top and is provided with a single vertical slot 111.

Intermediate these two bracket members 105 and 110 is provided an additional vertically extending bracket member 115, which has a bent inwardly upper end 116, and is provided also with an angularly extending slot 117 extending longitudinally at an acute angle downwardly in the direction of movement of the conveyor 35.

Also along the bar portion 104 between the bracket members 105 and 115, there are provided a pair of tapped holes for bolts 117′ extending through a pair of parallel slots 118 in an L-bracket 119 for its adjustability.

III(B). The endless belt means (1) *Adjustable entrance pulley.*—Referring now to FIGS. 1, 2, 6, 11 and 15, there is disclosed a pulley 120 freely rotatable on an axial member 121, which has an eccentric stub end 122 (see FIG. 6), which may be like a threaded bolt, and has its axis eccentric to the axis of the pulley. This stub or bolt end 122 fits through the slot 108 for not only horizontal adjustment along this slot 108, but also vertical adjustment due to the eccentricity of the bolt 122 to that of the axis of the pulley 120. This eccentric stub shaft 122 may be held in its adjusted position on the bent over angular portion 109 of bracket member 105 by means of a nut 123 and a lock washer 124. Thus, the angularity, both vertically and horizontally, of the pulley 120 are easily adjustable by the loosening of the nut 123 for sliding and rotation of the stub shaft 122 in the slot 108.

(2) *Adjustable driving pulley.*—At the other end of the sub-frame 101, on the bracket member 110, there is mounted a driving pulley 130 which is supported on a horizontal axial member 131 one end 132 of which is mounted in the vertical slot 111 in the bracket member 110. This shaft end 132 may be threaded for adjustability by means of the nut 133 and lock washer 134 in the vertical slot 111, for adjusting its vertical position with respect to the top of the highest cartons C which pass under it along the conveyor 35 if the assembly 100 is bolted to the bar 74, or with respect to the top of the lowest cartons C which pass under it if the floating assembly 100′ shown in FIG. 15 is used.

Also mounted on the axial member 131, outside the pulley 130, is a driving sprocket wheel 135, which is preferably keyed to rotate with the pulley 130 so as to drive the same. This sprocket wheel 135 is driven by a loose short sprocket chain 136 (see FIGS. 1 and 2) with the sprocket wheel 58 mentioned above in section I(B) so that in the embodiment shown in FIG. 15 can easily float between its full and dotted line positions therein shown. Because the sprocket 135 is at the end of the shaft member 131, when the sub-assembly 101 is loosened by the bolts or wing nuts 103 or shoulder bolt 103′, the sub-asembly 100 or 100′ may be moved sufficiently toward the axle 55 and pulley 58 to loosen the short sprocket chain 136 so it can be disengaged from the teeth at the periphery of the sprocket wheel 135, and then the whole assembly 100 or 100′ may be easily removed from the machine, and another similar assembly 100 or 100′ in proper adjustment may be similarly and quickly connected and fastened in its place.

Figure 7:
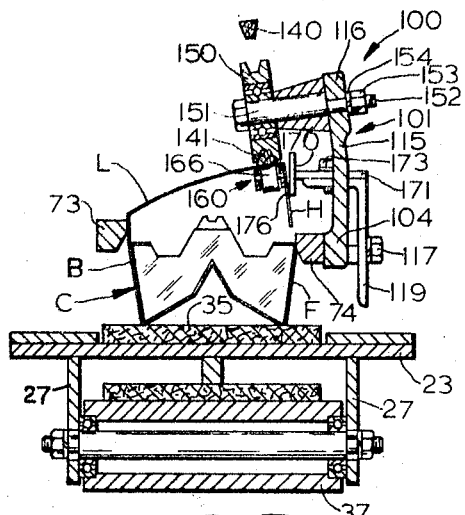
FIG. 7 is an enlarged vertical sectional view taken along line VII—VII of FIG. 1, taken in the direction of the arrows about midway of the removable or floating belt and guide assembly, showing the cover in a more closed position with the bent-over hook flap about ready to enter the carton.

Around the two pulleys 120 and 130 there is provided a belt 140, the lower reach 141 of which urges the lid L of a carton C gradually downwardly as shown in FIGS. 6, 7 and 8 into its closed position. This belt 140, by means of the relative sizes of the driving gears and/or sprocket wheels 46, 51, 54, 58 and 135, is driven so that its lower reach 141 will have a greater speed than that of the conveyor belt 35. This speed may be about 20% greater and is required in order to compensate not only for the longer angular distance of the belt 141, and any retarding friction of the shoe 160 or guide rails 73 and 74, but also to insure against any slippage with respect to the cartons C on the conveyor 35.

(3) *Adjustable idler pulley.*—The central part of the lower reach 141 of this endless belt 140 is guided by means of an adjustable idler pulley 150 (see FIGS. 1, 2, 7, 11, 12 and 15) mounted on an axial member 151, similar to member 121, and having a stub shaft 152 eccentric (see FIG. 7) to the axis of the pulley 150. This stub shaft 152 may be threaded and held in place by a nut 153 and lock washer 154 in the angular slot 117 in the bracket member 115, for both horizontal and vertical adjustment, similar to that for pulley 120.

III(C). The adjustable guide shoe

Below the forward or left hand portion of the reach 141 of the guide belt 140, is provided an adjustable guide shoe 160 as shown in FIGS. 1, 6, 7, 11, and 15, the left hand end of which is mounted by means of bolts 161 in the slots 106, 107 in the bracket member 105. This guide shoe extends from these slots 106 and 107 slightly upwardly and outwardly to underneath the left hand or first engaging portion of the reach 141 of the belt 140, so as to extend substantially directly under the and between the rollers 120 and 150. Substantially directly beneath these rollers 120 and 150 there may be provided a pair of slots 163 and 164 in which may be mounted frictionless rollers 165 and 166, respectively, to hold the upper surface of the lids L into engagement with the belt 140.

Since the bolts 161 mounting the bracket 160 are adjustable in the slots 106 and 107, the rollers 165 and 166 can be located substantially underneath the lower most points of the pulleys 120 and 150, respectively for insuring a good positive grip for the closing of the cover or lid L of the carton C.

III(D). The adjustable flap closing strip

Referring now to FIGS. 1 and 2, 6, 7, 8, 9, 11, 12 and 15, there is specifically shown an additional guide strip or twisted plate member 170, which is twisted from an acute angle to the horizontal on one side of the vertical at its carton entrance end at the left in FIGS. 11, 12, and 15 through a vertical position as shown in FIG. 7 under the idler pulley 150, to an obtuse angle to the same horizontal on the opposite side of the vertical, as shown in FIG. 8. This guide strip or plate 170 engages the hook flaps H and insures that they fold inwardly sufficiently for locking of the hooks thereon.

The central portion of this strip 170 may be supported by a bracket 171 attached to its back and provided with a slot 172 for horizontally adjustable connection by a bolt 173 to the top of the vertically adjustable L-bracket 119 attached to the bar portion 104 of the sub-frame 101. Thus the bracket 170 may be both vertically and horizontally adjustable with respect to the hook flaps H in the vertical slots 118 and horizontal slots 172 through which it is supported.

The left or entrance end 174 of this twisted guide strip 170, as shown in FIG. 6, first starts to bend the flaps H from an obtuse open position to a substantially vertical position under the pulley 115 in its central portion 176 shown in FIG. 7 under the idler pulley 150, and then inwardly by its terminal portion 177 as shown in FIG. 8.

Along the lower edge of the right hand end or portion 177 of the guide strip 170 there are provided a plurality of downwardly angled, acute to the horizontal, spring fingers 181 through 184, which project outwardly toward the center of the conveyor 35 to force the hook flaps H inwardly under the covers or lids L of the cartons C so that their hooks will pass inwardly beyond the webs W shown in FIGS. 2, 8 and 9 at the ends of the crosspartitions P, so that when they are then released by the last one of the fingers to pass off of the flap H, that flap H will snap back to its vertical position and its hooks will snap into engagement under the webs W and lock the carton lid L closed. These spring fingers 181 through 184 are of different lengths to provide for the different height cartons; the lowest carton having the lowest and last finger 184 giving the final inwardly push of the flaps H, while in the larger containers this lower finger 184 rides over the front wall F of the carton C as shown in FIG. 9, and one or more of the shorter fingers 181 through 183 engage the flaps H to force them inwardly for engagement of their hooks under the webs W of these higher cartons C.

Thus as the carton C moves along the conveyor 35 and past the removable endless belt 140 and guide 160 and 170 assembly 100 or 100′, the cover or lid L of the carton C is completely closed and locked, and the carton C is ready to pass the dater and/or taper 60, previously described, if such a device is employed.

While there is described above the observed principles of this invention in connection with specific apparatus, it is to be clearly understood that there may be many unobserved side effects which contribute substantially to the efficiency of this device and that this description is made only by way of example and not as a limitation to the scope of this invention.

I claim:
1. A machine for closing filled fiberboard cartons having a cover attached along one wall of the carton and a hook flap engageable with the opposite wall, said machine comprising:
(A) a main frame,
(B) a horizontal conveyor mounted on said main frame for supporting the bottom of said cartons,
(C) guide means attached to said main frame for guiding said cartons along said conveyor,
(D) means mounted on said main frame for driving said conveyor,
(E) two fixed folding bars attached to said main frame on opposite sides of the carton feeding end of said conveyor, said bars extending over and along said conveyor in its direction of movement, the outer portions of said bars being overlapped and spaced apart for engagement with opposite surfaces of said cover to fold it from a vertical position over at an angle across the top of said carton and to bend said hooked flap downwardly,
(F) cover closing assembly mounted along one side of said conveyor adjacent the free ends of said folding bars, said assembly comprising:
(1) a sub-frame removably attached to said main frame,
(2) a pair of spaced pulleys mounted on said sub-frame, the one pulley adjacent said bars being mounted on an axis transverse of the movement of said conveyor and at an acute angle downwardly from the horizontal approaching said angle of the cover as it leaves the free ends of said bars, said axis of said one pulley being adjustable vertically and horizontally in said sub-frame, the other pulley of said pair of pulleys being mounted on a horizontal axis transverse of the movement of said conveyor and together with an easily disengageable driving means with said driving means for said conveyor, the axis of said other pulley being vertically adjustable in said sub-frame,
(3) an endless belt extending around said pulleys having a lower reach extending downwardly at an acute angle to the horizontal for engagement with the upper surface of said cover from its bent-over position at the free ends of said bars to near its completely closed position for said carton,
(4) a third pulley intermediate said pair of pulleys engaging said lower reach and urging it downwardly against said upper surface of said cover, the axis of said third pulley also being mounted on said sub-frame transverse of the movement of said conveyor and for both vertical and horizontal adjustment,
(5) a first shoe extending from beneath said one pulley along said reach to beneath said third pulley, said first shoe being adjustably mounted to said sub-frame at an acute angle to the horizontal, and
(6) a second shoe extending along the outer surface of said bent-over hooked flap of said cover from a downwardly acute angle adjacent said one pulley to an obtuse angle adjacent said other pulley, said second shoe being adjustably mounted to said sub-frame, and said second shoe having a plurality of spring fingers along its outer portion for engagement with the hook portions of said flap.

2. A machine according to claim 1 including means for floatingly mounting said sub-frame to said main frame.

3. A machine according to claim 2 wherein said floating mounting comprises a pivot attachment to said main frame near the carton entrance end of said sub-frame.

4. A machine according to claim 2 including means for counterbalancing part of said floating sub-frame.

5. A machine according to claim 1 wherein said axis of said one pulley is mounted in a slot in said sub-frame at an acute angle to the horizontal in the direction of movement of said conveyor.

6. A machine according to claim 5 wherein said axis of said one pulley comprises an axle having a center which is eccentric to its mounting in said slot.

7. A machine according to claim 1 wherein said easily disengageable driving means comprises a sprocket adjacent said other pulley and a sprocket chain connecting said sprocket to said driving means for said conveyor.

8. A machine according to claim 1 wherein said driving means for said belt from said means for driving said conveyor includes a friction clutch.

9. A machine according to claim 1 wherein said driving means for said belt drives said reach of said endless belt faster than the speed of said conveyor and said cartons thereon to compensate for the slippage and angularity of said reach with respect to the movement of said conveyor and said cartons thereon.

10. A machine according to claim 1 including a bevelled roller mounted on said main frame on the opposite side of said conveyor from said assembly for engagement with the upper edge of said cover adjacent its attachment to said carton.

11. A machine according to claim 1 wherein said fiberboard cartons comprise egg cartons of different depths for small, medium, large and extra large type eggs, all of which cartons have substantially the same width.

12. A machine according to claim 1 wherein said axis of said third pulley is mounted in a slot in said sub-frame at an acute angle to the horizontal in the direction of movement of said conveyor.

13. A machine according to claim 12 wherein said axis of said third pulley comprises an axle having a center which is eccentric to its mounting in said slot.

14. A machine according to claim 1 wherein said first shoe is mounted in a slot in said sub-frame.

15. A machine according to claim 1 wherein said first shoe includes frictionless roller means opposite said one and said third pulleys for engagement with the underside of said cover to hold and guide said cover along its lower reach of said belt.

16. A machine according to claim 1 wherein said second shoe is mounted in horizontal and vertical slots to and in said sub-frame.

17. A machine for closing filled fiberboard cartons of substantially the same width but of varying heights within about 10% of each other, and having a cover attached along one wall of each carton and a bayonet type hook flap engageable with the opposite wall, said machine comprising:
- (A) a main frame,
- (B) a horizontal conveyor mounted on said main frame for supporting the bottom of said cartons,
- (C) guide means attached to said main frame for guiding said cartons along said conveyor from near one end of said machine to near the other.
- (D) means mounted on said main frame for driving said conveyor,
- (E) two fixed holding bars attached to said main frame on opposite sides of said one end of said conveyor, said bars extending over and along said conveyor in its direction of movement, the outer portions of said bars being overlapped and spaced apart for engagement with opposite surfaces of said cover to fold it from a vertical position over at an angle across the top of said carton and to bend said hooked flap downwardly,
- (F) a driven loop belt and shoe cover closing assembly mounted along one side of said conveyor adjacent the free ends of said folding bars, said assembly comprising:
  - (1) a sub-frame removably attached to said main frame,
  - (2) a pair of spaced pulleys mounted near opposite ends of and on said sub-frame, the one pulley adjacent said bars being mounted on an axis transverse of the movement of said conveyor and at an acute angle downwardly from the horizontal approaching said angle of the cover as it leaves the free ends of said bars, said axis of said one pulley being adjustable vertically and horizontally in an angular slot in said sub-frame at an acute angle to the horizontal in the direction of movement of said conveyor, the other of said pair of pulleys being mounted on a horizontal axis transverse of the movement of said conveyor and together with an easily disengageable driving sprocket, the axis of said other pulley being vertically adjustable in said sub-frame,
  - (3) an endless belt extending around said pulleys having a lower reach extending downwardly at an acute angle to the horizontal for engagement with the upper surface of said cover from its bent-over position at the free ends of said bars to near its completely closed position for the highest of said cartons,
  - (4) a third pulley intermediate said pairs of pulleys engaging said lower reach and urging it downwardly against said upper surface of said cover, the axis of said third pulley being mounted in a slot in said sub-frame for adjustment both vertically and horizontally at an acute angle similar to that for said one pulley,
  - (5) a first shoe extending from beneath said one pulley along said reach to beneath said third pulley, said first shoe being adjustably mounted to said sub-frame in a slot at an acute angle substantially parallel to and adjacent to that adjustment for the axis of said one pulley, said first shoe including a frictionless roller means opposite said one and said third pulleys for engagement with the underside of said cover to hold and guide said cover along its lower reach of said belt, and
  - (6) a second shoe extending along the outer surface of said bent-over hooked flap of said cover from a downwardly acute angle adjacent said one pulley to a downwardly obtuse angle adjacent said other pulley, said second shoe being adjustably mounted in slots to said sub-frame, said second shoe having a plurality of spring fingers along its outer portion for engagement with the hook portions of said flap from the lowest to the highest carton, and
- (G) easily detachable sprocket chain drive means from said means for driving said conveyor for driving said sprocket to move said endless belt at a faster speed than said cartons along said conveyor to compensate for slippage and the angularity of said reach with respect to the movement of said conveyor.

18. A machine according to claim 17 including means for floatingly mounting said sub-frame to said frame.

19. A machine according to claim 18 wherein said mounting means comprises a pivot near the carton entrance end of said sub-frame and spring means for counterbalancing part of the carton exit and floating end of said sub-frame.

20. A machine according to claim 17 wherein said one pulley comprises an axle having a center which is eccentric to that of its mounting pin in said angular slot.

21. A machine according to claim 17 wherein said axis of said third pulley comprises an axle having a center which is eccentric to that of its mounting pin in said angular slot.

References Cited

UNITED STATES PATENTS

| | | | |
|---|---|---|---|
| 2,821,830 | 2/1958 | Fahey | 53—376 |
| 2,998,688 | 9/1961 | Randles | 53—376 |
| 3,131,524 | 5/1964 | Peppler et al. | 53—376 |
| 3,299,615 | 1/1967 | Singer | 53—376 |

TRAVIS S. McGEHEE, Primary Examiner

UNITED STATES PATENT OFFICE
CERTIFICATE OF CORRECTION

Patent No. 3,456,426                        July 22, 1969

Richard J. Fahey

It is certified that error appears in the above identified patent and that said Letters Patent are hereby corrected as shown below:

Column 1, line 24, "pre-adjusted" should read -- pre-adjustable --. Column 2, line 65, after "one" insert -- end --. Column 6, line 55, "bushing" should read -- bushinged --. Column 7, line 64, "sub-asembly" should read -- sub-assembly --.

Signed and sealed this 28th day of April 1970.

(SEAL)
Attest:

Edward M. Fletcher, Jr.                      WILLIAM E. SCHUYLER, JR.
Attesting Officer                              Commissioner of Patents